July 29, 1952   B. H. WARD   2,605,023
ROTARY SEED DISK WITH PERIPHERAL POCKETS PROTECTED
BY A FLEXIBLE COVER ENGAGING SAID POCKETS
Filed March 31, 1949   3 Sheets-Sheet 2
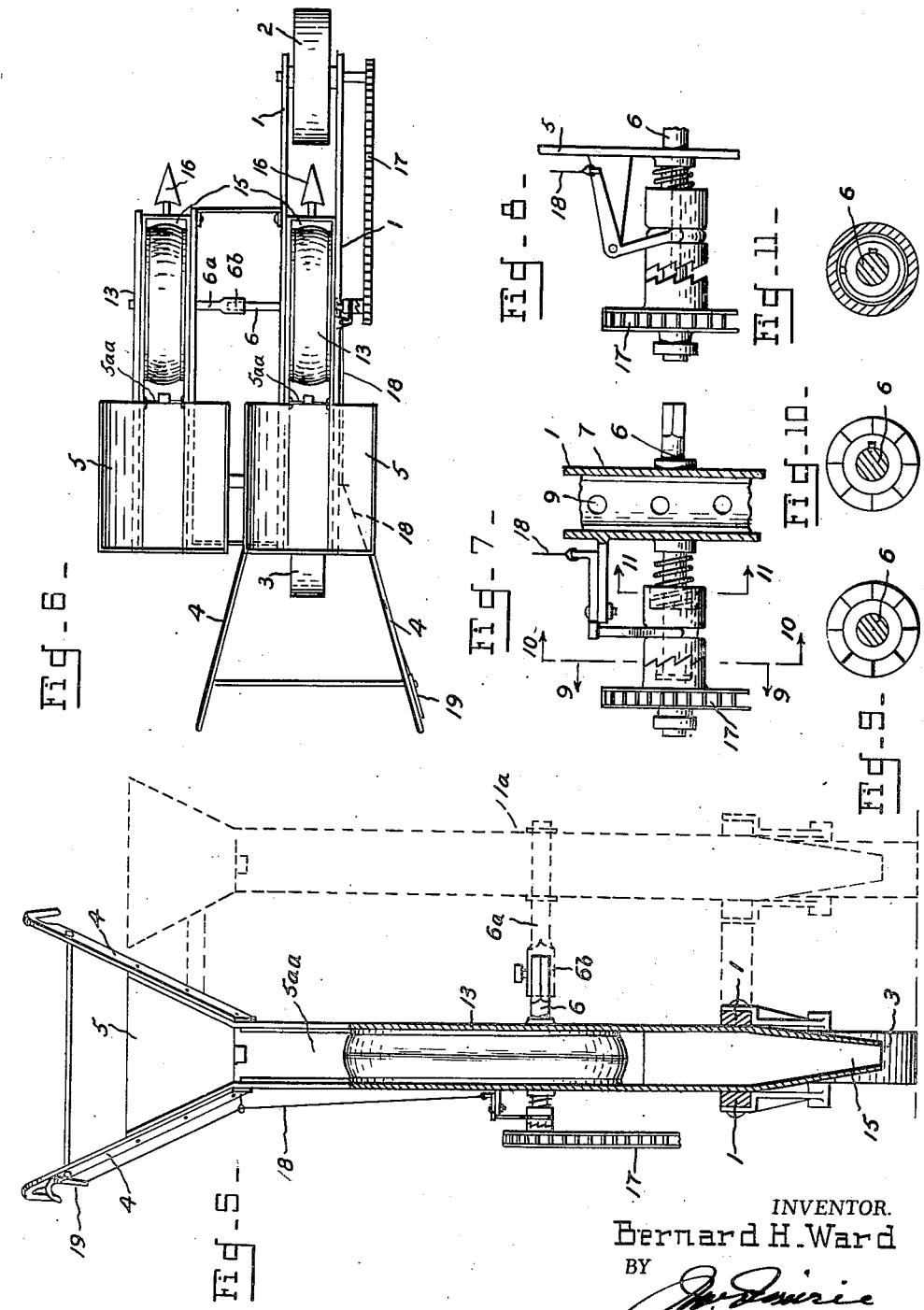
INVENTOR.
Bernard H. Ward
BY
ATTY.

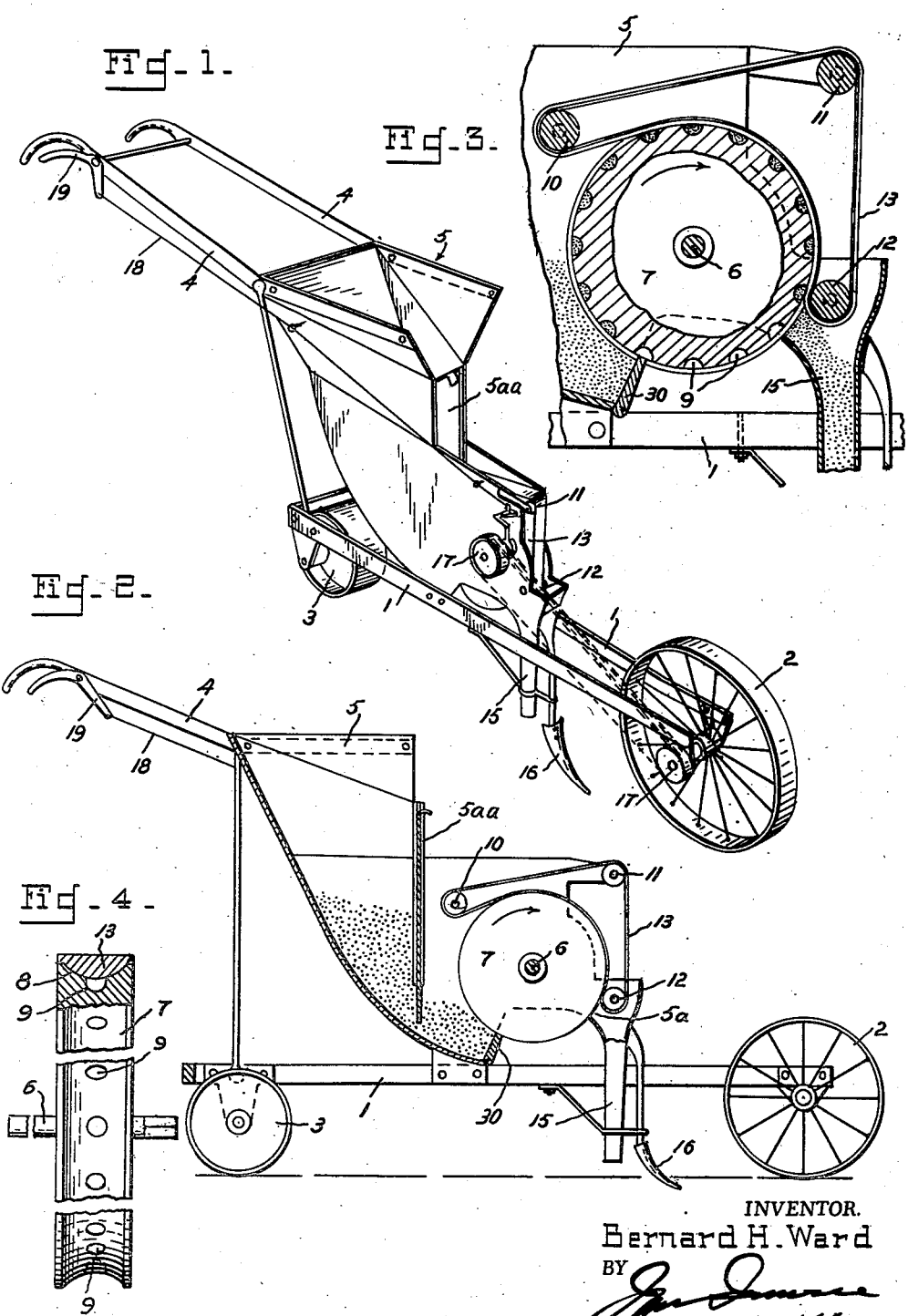

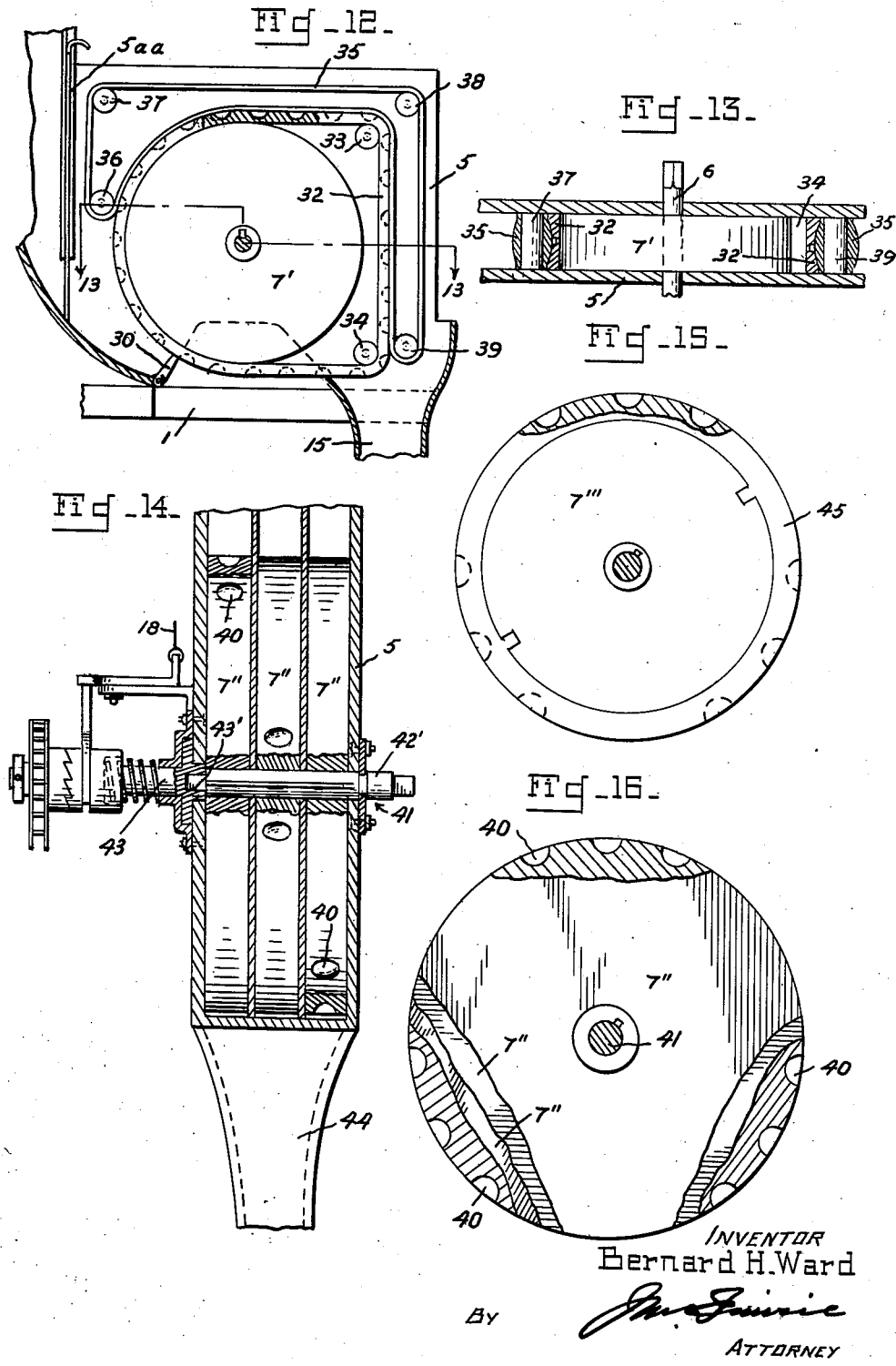

Patented July 29, 1952

2,605,023

UNITED STATES PATENT OFFICE 2,605,023

ROTARY SEED DISK WITH PERIPHERAL POCKETS PROTECTED BY A FLEXIBLE COVER ENGAGING SAID POCKETS

Bernard H. Ward, Atwater, Ohio

Application March 31, 1949, Serial No. 84,718

1 Claim. (Cl. 222—177)

This invention relates to improvements in seed planters.

The object of the invention is to provide a seed planter having a rotary seed pick-up having a series of pockets to pick up seed from a hopper and a flexible cover of protector operatively associated with the rotary seed pick-up to retain the seed in the pockets during the period or interval between the time the seed are gathered in the pockets within the hopper until delivery for planting to prevent them from falling out or being blown away.

A further object of the invention is to provide a rotary seed pick-up, the periphery of which is slightly concaved to readily gather seed and deliver same to a series of pockets.

A further object of the invention is to provide a rotary seed pick-up and a flexible cover or protector for the seed, cooperating with the periphery of the pick-up and frictionally operated in conjunction with the pick-up in transmitting the seed when picked up until the seed are delivered to planting position.

Another object of the invention is to provide a seed pick-up and a flexible endless belt-like cover to protect and retain the picked-up seed in transit from the time the seed are picked up until same are delivered to planting position.

While my invention is particularly designed to pick up individual seeds and deliver same in spaced relation when planting in rows, the rotary seed pick-up disc and the associated flexible cover employed to hold the seed in the pockets in the disc is not limited to use with the pockets. Therefore, it is one of the objects of this invention to provide a seed pick-up and cover, capable of use for picking up individual seeds and delivering same in the usual spaced relation in rows or picking up the seed and thereafter broadcasting same.

My invention is so constructed and arranged that additional units may be added, so that seed of one type which grow quickly or seed of a different type which grow slowly can be simultaneously planted.

The invention also comprehends improvements in the details of construction and arrangement of parts which will be hereinafter described and particularly pointed out in the claims.

In the accompanying drawings:

Figure 1 is a perspective view of the improved seed planter.

Figure 2 is a central vertical section of the same.

Figure 3 is a detail enlarged vertical section of the seed pick-up and covering belt.

Figure 4 is an edge elevation partly in transverse section of the seed pick-up disc.

Figure 5 is a transverse section showing a separate unit attached to a seed planter.

Figure 6 is a plan view of the unit arrangement shown in Figure 5.

Figure 7 is a detail, partly in section, showing the clutch.

Figure 8 is a plan view of the same.

Figures 9, 10 and 11 illustrate sectional views of the clutch taken on the lines 9—9, 10—10 and 11—11 of Figure 7.

Figure 12 is a sectional view of a modified form of seed planter.

Figure 13 is a section of same on line 13—13 of Figure 12.

Figure 14 is a vertical section illustrating a plurality of discs in the hopper.

Figure 15 is a detail view of a disc with an annulus thereon and in which the seed pockets are formed.

Figure 16 is a side view of several discs, parts being broken away to illustrate the location of the pockets in the several discs.

In the drawings, 1 indicates a frame mounted on a forward traction wheel 2 and a rear supporting or covering wheel 3. Rising from the frame are handles 4, and mounted on the frame 1 between the handles is a hopper 5, the lower or bottom portion of which inclines downwardly and forwardly to the open end 5a. Mounted on a shaft 6 in the open end of the hopper is a rotary seed pick-up disc 7, the periphery of which is slightly concave as shown at 8, and a series of spaced-apart pockets 9 are provided in the concave portion. Suitably mounted on rollers 10, 11 and 12, is an endless belt 13, equal in width to the thickness of the disc. This belt is convex on its outer surface and corresponds to the slight concave curvature of the periphery of the disc and serves to cover the pockets and retain the seed in the pockets while in transit from the time of pick up until they reach the delivery point for planting. The belt frictionally engages the periphery of the disc and is moved in unison with the disc as the same is rotated.

The pockets are employed when planting individual seed, usually spaced apart in rows. However, when it is desired to broadcast the seed, the pockets can be dispensed with and the seed is simply confined in the curved periphery of the disc and there held and delivered in broadcast fashion. When using for broadcasting seed, a disc is substituted without pockets.

The purpose in concaving the periphery of the disc is to induce or direct the mass of seed in the hopper to the center of the peripheral surface or to the pockets as the disc is rotated.

At the appropriate place in front of the disc is a spout 15 to direct the seed falling from the pockets to the row below. In front of the spout is a small plow 16 to form a trench in the row, while the rear traction wheel serves to cover up the seed deposited by the spout.

The disc is rotated through the medium of a chain and sprocket wheels 17 between the shafts of the disc and the forward traction wheel.

On the shaft 6 is a clutch 6' normally spring engaged and operated through a bell-crank lever 18' pivoted to a bracket supported on the hopper 5 and provided with a fork straddling the movable clutch member and connections 18 with a lever 19 on one of the handles to engage or disengage the power from the disc.

In operation, seeds are dropped in the hopper and accumulate around the disc 7 and obviously fall in the pockets. As the disc is rotated, the seed in the pockets come under the belt or cover 13 and are confined due to the movement of the periphery of the disc and the endless belt in unison. Then, when the pockets leave the confining influence of the belt, the seed drop into the spout 15 to the row below.

If for any reason it be desired to stop rotation of the disc, the clutch is operated to disengage same and the apparatus can be moved about without waste of seed. To clean the hopper, a hinged door 30 is provided between the lower part of the hopper and disc 7.

This invention is susceptible to several operations. First, as previously described, seed may be planted in a row in spaced relation by using a disc with pockets, or by using a disc with a concave periphery without pockets, seed may be broadcast, or two units may be coupled together to plant seed simultaneously which require shorter and longer times to develop.

When using the invention to simultaneously plant seed requiring different periods of time for development, I employ a unit having all the essential characteristics of the structure described, except that the frame 1 is shortened and the usual or additional front traction wheel is eliminated. The unit comprises a frame 1a; a hopper; disc; an endless belt; a spout; a plow and a covering wheel.

The frame 1a is attached to the frame 1 in any suitable manner, and the shaft 6a is extended beyond the hopper and abuts against the extended end of the shaft 6 and a coupling 6b connects the two shafts to operate both discs together. Suitable braces are employed to secure the unit to the hopper 5, as shown in Figures 5 and 6. In this manner, two types of seed can be planted at the same time.

In Figure 12 I have illustrated a modification of the seed pick-up. In this figure, a disc 7' is provided, but in lieu of the pockets being formed in the disc, said pockets 31 are formed in a flexible belt 32 which, like the disc 7, is concave on its outer surface. This belt 32 trails over the rear portion of the disc, then extends forwardly over an upper roller 33 spaced forwardly from the periphery of disc 7 and in horizontal alignment with the top of said disc, then extends around a lower roller 34 similarly spaced forwardly from the periphery of disc 7' and in horizontal alignment with the bottom of said disc 7' below and in vertical alignment with the roller 33, thence rearwardly and trained around the disc.

Arranged over a portion of the belt 32 in a covering flexible belt 35 convex on its outer surface like belt 13 to fit the concaved outer surface of the belt 32. This covering belt is trailed around a roller 36 mounted in the hopper in rear of the disc, thence up and around a second roller 37, and then forwardly around a third roller 38, then down and around a fourth roller 39, thence up and in contact with the surface of the belt 32 to the roller 36. Thus, in this arrangement, the seed are first picked up in the pockets 31 of belt 32 within the hopper in the same way as in the preferred form shown and described and conveyed to the forward part of the hopper and delivered to the spout and planted.

In both constructions, the seed are protected and covered from the time they are picked up until they reach the point of delivery for planting, thus preventing them from falling out or being blown away.

The invention, as heretofore stated, contemplates the use of the machine for planting different kinds of seed requiring different periods of time to develop. In Figure 14, I have shown three different compartments in the hopper. In each compartment is a disc 7'' formed on a portion of its periphery with pockets 40. For instance, as shown in Figure 16, one disc will have pockets 40 for say about one-third or less of its circumference, and on the two adjacent discs pockets will be formed. The pockets on numbers two and three discs will be disposed out of horizontal alignment with the pockets in the first-mentioned disc, as shown for instance in Figure 16.

The discs are mounted on a two-part shaft 41. One part 42 is mounted in one side of the hopper, as shown at 42', and its inner end is square and inserted in a square socket 43' in the end of the second part 43 of the shaft. This second part 43 of the shaft is mounted in a bearing to secure it in position on the opposite side of the hopper, as shown in Figure 14. This part 43 carries the clutch 6' and actuating mechanism associated therewith as previously described with connection 18 to lever 19 on a handle 4 to control rotation of the discs.

The three compartments deliver the seed to a common spout 44, which in turn delivers the seed from the respective discs in line in a single row in spaced-apart intervals.

When it is desired to change the discs having a different number of pockets, the shaft section 42 is removed, which frees the discs to permit their removal for insertion of other discs having differently arranged pockets.

In lieu of having the pockets formed in the periphery of the discs, I may provide discs 7''' of smaller diameter. On each of the discs 7''' I mount a ring-like member 45, in the periphery of which the pockets are formed, as shown in Figure 15. By this means, I may have in hand a series of rings, each having a different combination of pockets to accommodate different kinds of seed and the length of the rows of such seed to be planted in a single row.

To properly direct the seed in the bottom of the hopper to the disc and covering belt, a sliding partition 5aa is arranged vertically in the hopper 5 in back of the disc to regulate the flow of seed below the disc or pick-up means at the back part thereof in rear of the wall formed by the cleanout door 30. Of course, when using the form of the invention shown in Figure 14, there will be a sliding partition in each compartment.

What I claim is:

A seed planter comprising a frame, a traction wheel at the fore of the frame and a covering wheel at the aft of the frame, handles on the frame, a hopper mounted on the frame between the handles said hopper having an open end and the bottom of the hopper inclining downwardly and forwardly to the open end, a transverse shaft mounted in the open end of the hopper, driving means between said shaft and said tracting wheel, a continuously movable rotary seed pick-up disc mounted on the shaft in the hopper and having a concave periphery and having a series of relatively spaced hemispherical seed-receiving pockets opening into the trough portion of said concave periphery and disposed inwardly of said trough portion, a spout mounted at the open end of the hopper and partially covering a portion of said seed pick-up disc, a first roller mounted within the upper portion of the spout, a second roller mounted in the hopper above said pick-up disc and in vertical alinement with said first roller, a third roller mounted in the hopper laterally of the first and second rollers at a point slightly below the upper edge of the seed pick-up disc, an endless convex band mounted on the rollers trailing and frictionally engageable with and movable over the top and front portions of said rotating discs to move in unison with said seed pick-up disc and to retain seed picked up in the pockets until said pockets reach a point below said first roller at which time the seeds are discharged into said spout, a vertically slidable partition in the hopper in the rear of the rotary seed pick-up disc forming with the bottom of the hopper an adjustable opening for regulating the supply of seed to be delivered to the seed pick-up disc and a hinged cleanout door at the lower portion of the hopper between the bottom of the hopper and the rotary seed pick-up disc.

BERNARD H. WARD.

REFERENCES CITED

The following references are of record in the file of this patent:

UNITED STATES PATENTS

| Number | Name | Date |
|---|---|---|
| Re. 3,197 | Jones et al. | Nov. 17, 1868 |
| 4,405 | Putnam | Mar. 7, 1846 |
| 197,953 | Trayser | Dec. 11, 1877 |
| 381,357 | Gardner | Apr. 17, 1888 |
| 648,876 | McKnight | May 1, 1900 |
| 988,539 | Balint | Apr. 4, 1911 |
| 1,115,777 | Briscoe | Nov. 3, 1914 |
| 1,278,573 | Bennet et al. | Sept. 10, 1918 |
| 1,550,983 | Pratt | Aug. 25, 1925 |
| 1,867,039 | Von Ohlsen | July 10, 1932 |
| 2,174,120 | Cobbley et al. | Sept. 26, 1939 |
| 2,184,545 | Collier | Dec. 26, 1939 |

FOREIGN PATENTS

| Number | Country | Date |
|---|---|---|
| 140,749 | Germany | Apr. 28, 1903 |
| 200,193 | Great Britain | July 6, 1923 |